US012771689B2

(12) United States Patent
Canfield et al.

(10) Patent No.: US 12,771,689 B2
(45) Date of Patent: Oct. 20, 2026

(54) SYSTEM AND METHOD FOR AUTOMATICALLY REGISTERING A VERIFIED IDENTITY IN AN ON-LINE ENVIRONMENT

(71) Applicant: Traitware, Inc., Nevada City, CA (US)

(72) Inventors: Christopher Canfield, Santa Clarita, CA (US); Carson Hawley, Nevada City, CA (US); Kyle Conrad, Penn Valley, CA (US); Herbert W Spencer, Grass Valley, CA (US)

(73) Assignee: Traitware, Inc., Nevada City, NV (US)

( * ) Notice: Subject to any disclaimer, the term of this patent is extended or adjusted under 35 U.S.C. 154(b) by 792 days.

(21) Appl. No.: 17/177,096

(22) Filed: Feb. 16, 2021

(65) Prior Publication Data

US 2021/0168140 A1 Jun. 3, 2021

Related U.S. Application Data

(63) Continuation of application No. PCT/US2019/046432, filed on Aug. 14, 2019.

(60) Provisional application No. 62/801,574, filed on Feb. 5, 2019, provisional application No. 62/718,959, filed on Aug. 14, 2018.

(51) Int. Cl.
*G06F 7/04* (2006.01)
*H04L 9/40* (2022.01)

(52) U.S. Cl.
CPC ................................ *H04L 63/0876* (2013.01)

(58) Field of Classification Search
CPC . H04L 63/0876; H04L 63/10; H04L 63/0838; G06F 21/31; G06F 21/44; G06F 21/12
See application file for complete search history.

(56) References Cited

U.S. PATENT DOCUMENTS

| | | | | |
|---|---|---|---|---|
| 7,308,261 | B2 * | 12/2007 | Henderson | H04L 51/04 455/435.2 |
| 9,195,477 | B1 * | 11/2015 | Spencer | G06F 8/54 |
| 9,785,974 | B1 * | 10/2017 | Periasamy | G06Q 30/0267 |
| 2004/0093595 | A1 * | 5/2004 | Bilange | G06F 8/61 717/176 |
| 2008/0025278 | A1 * | 1/2008 | Hoecker | H04W 24/00 370/338 |
| 2010/0043062 | A1 * | 2/2010 | Alexander | H04L 9/3226 726/6 |

(Continued)

OTHER PUBLICATIONS

Akram et al. A Privacy Preserving Application Acquisition Protocol, Jun. 27, 2012, IEEE, pp. 383-392. (Year: 2012).*

(Continued)

*Primary Examiner* — Philip J Chea
*Assistant Examiner* — Jenise E Jackson
(74) *Attorney, Agent, or Firm* — Kari L. Barnes

(57) ABSTRACT

Exemplary embodiments described herein include a system and method that allows for a much simpler user onboarding experience when registering a new mobile application with a service provider. An exemplary method for registering a software application includes creating a dynamic link, sending the dynamic link to a user to be accessed by the user from a mobile device, and automatically registering an application access by the dynamic link when the dynamic link is activated by a user.

18 Claims, 9 Drawing Sheets

(56) References Cited

U.S. PATENT DOCUMENTS

| | | | | |
|---|---|---|---|---|
| 2011/0055810 | A1* | 3/2011 | DeHaan | H04L 41/00 719/328 |
| 2014/0267770 | A1* | 9/2014 | Gervautz | H04N 23/69 709/219 |
| 2015/0163291 | A1* | 6/2015 | Fukasaka | H04L 67/306 709/201 |
| 2015/0334108 | A1* | 11/2015 | Khalil | H04L 63/0884 726/8 |
| 2016/0034238 | A1* | 2/2016 | Gerlach | G06F 3/1423 345/1.1 |
| 2016/0196579 | A1* | 7/2016 | Koura | G06Q 30/0275 705/14.53 |
| 2016/0234330 | A1* | 8/2016 | Popowitz | H04L 67/565 |
| 2016/0261600 | A1* | 9/2016 | Bae | H04W 12/0431 |
| 2016/0321052 | A1* | 11/2016 | Sharifi | H04M 1/72406 |
| 2017/0195397 | A1* | 7/2017 | Boudville | G06F 9/45558 |
| 2017/0289339 | A1* | 10/2017 | Riva | H04M 1/72445 |
| 2017/0295257 | A1* | 10/2017 | Bao | H04L 67/125 |
| 2017/0346802 | A1* | 11/2017 | Gruskin | G06F 8/62 |
| 2019/0265958 | A1* | 8/2019 | Ayers | G06F 21/45 |
| 2021/0166226 | A1* | 6/2021 | Wang | G06F 16/9535 |

OTHER PUBLICATIONS

Hallsteinsen et al., Using the Mobile Phone as a Security Token for Unified Authentication, Aug. 31, 2007, IEEE, pp. 1-6. (Year: 2007).*

* cited by examiner

SYSTEM AND METHOD FOR AUTOMATICALLY REGISTERING A VERIFIED IDENTITY IN AN ON-LINE ENVIRONMENT

PRIORITY

The instant application claims priority to U.S. Provisional Patent Application No. 62/801,574, filed Feb. 5, 2019, and U.S. Provisional Patent Application No. 62/718,959, filed Aug. 14, 2018, each of which are incorporated herein in their entirety.

BACKGROUND

Users often have many accounts that they create for various web services. These can be banking, e-commerce, health, enterprise business related, and a myriad of other available services. When the user wants to register a mobile application with these web services, they need to log into their accounts on the app, often using a username and password. This can be frustrating because many times the user does not know their password for a service or it is far too complex to memorize. They may have created it a long time ago and do not have a password manager to auto-fill it for them on their mobile device. Additionally, many mobile apps, such as those for banking and finance, do not support auto-fill passwords for security reasons. The user must resort to other means to register their mobile app, such as typing in the password from a desktop password manager, or copying and pasting from a mobile app password manager.

Registering accounts directly on mobile apps can be a cumbersome experience. You often have to fill out information about yourself, such as your name and email and you must choose a password to secure the account. Often a user account is created first on a website and the user must log into that account on the mobile app using an email or username and a password or other secret registration code. In other instances a password or registration code is generated during the initial web-based registration and delivered to the user by email or SMS, which the user then uses to complete the mobile app registration. Many times this is a single use password that is cumbersome to type and the user is required to immediately create a new password after initial registration.

In addition to having to register the mobile app, the user must find the app on the appropriate app store and download it prior to registration. Having to search for the mobile app in the store adds another step for the user. Combining all of the needed steps to onboard a new customer to a mobile application associated with a web service can result in user frustration, disengagement, and ultimately a potentially lost customer for the service provider.

In several of the presented registration scenarios, a password can be used to register a mobile application with a web service. In many of these instances, including those with previously existing user accounts, knowledge of the email and password are all a bad actor needs to maliciously register a mobile application with an account. This presents a security risk to the user and the service provider, as anyone with possession of the email or username and password may register a mobile application with the service provider, and account information of the user may be compromised without an awareness by either party.

SUMMARY

Exemplary embodiments described herein include a system and method that allows for a much simpler user onboarding experience when registering a new mobile application with a service provider. Exemplary embodiments may permit application registration without usernames or passwords manually entered into the mobile application by the user for registration. Exemplary embodiments may permit the retrieval of a desired application without searching and downloading the application from an application store. Exemplary embodiments may also provide a layer of security by eliminating or reducing the use of long-lived passwords as a means for associating a mobile application with an existing service provider account.

Exemplary embodiments include first creating a user account by a user or an administrator on a web portal attached to a service provider. During this registration process, user information may be added to the user account. User information can include an email address, a mobile number, or other communication identification, but may include any combination of pieces of user information. When the account is initially created, a mobile app registration message may be sent to the user via email, SMS, or other entered communication identification method. This message may contain a short-lived registration code. The registration code may consist of any sequence and length of numbers, letters, characters, and combinations thereof sufficient to make the code significantly difficult to guess. The registration message may be embedded in a button, such as might be found in an email, or a web link that can be selected by the user.

Exemplary embodiments include receiving the mobile app registration message at a mobile device of the user intended to receive the mobile application associated with the web portal or service provider. When the user receives the registration message, the user may click on the registration button in an email or web link in an SMS message or otherwise activate the message link.

Exemplary embodiments may include initiating a service after activating the button or web link that checks the device to see if the mobile application needed to register the user is already installed. If the needed application is not installed, the service automatically takes the user to the appropriate application store page, such as the Apple App Store or Google Play Store, for the needed application. Once directed to the application store page, the user can click the install button for that application to install it. After installing the application, the user opens the application. Upon opening the application, a service in the app determines that the registration process initiated before an app was installed is to be continued. The service returns the dynamic link to the application for further use. The application then uses the registration code in the link to register the user with the service provider. This may also include the use of an email address, username, or other identifier in addition to the registration code. In the situation where the app was previously installed, the dynamic link service could return the dynamic link to the installed application for continuing the registration process without the need to install the app first.

In an exemplary embodiment, in addition to sending the registration message during initial user creation at the service provider, the auto-registration message may also be sent at a later time as determined by the user or the administrator. In the event of a user needing to recover an account from a lost device, deleted application or other factor which compromises a user account, a new registration code may be created and sent to the user to auto-register a new account with the application.

In one embodiment, the service provider may incorporate additional identity requirements to handle the registration and identities of the users of their service. This may include the application needed to register the users with the service provider's service and gain access to the service provider's services. In another embodiment, the additional identity requirements may be integrated into the program or may be outsourced to third party applications.

Exemplary embodiments may be used to simplify an onboarding process of a user to register a mobile application on a mobile device associated with an on-line account or service provider while eliminating the need for a user to enter a username or password to register the mobile application with the service.

DRAWINGS

DETAILED DESCRIPTION

Figure 1:
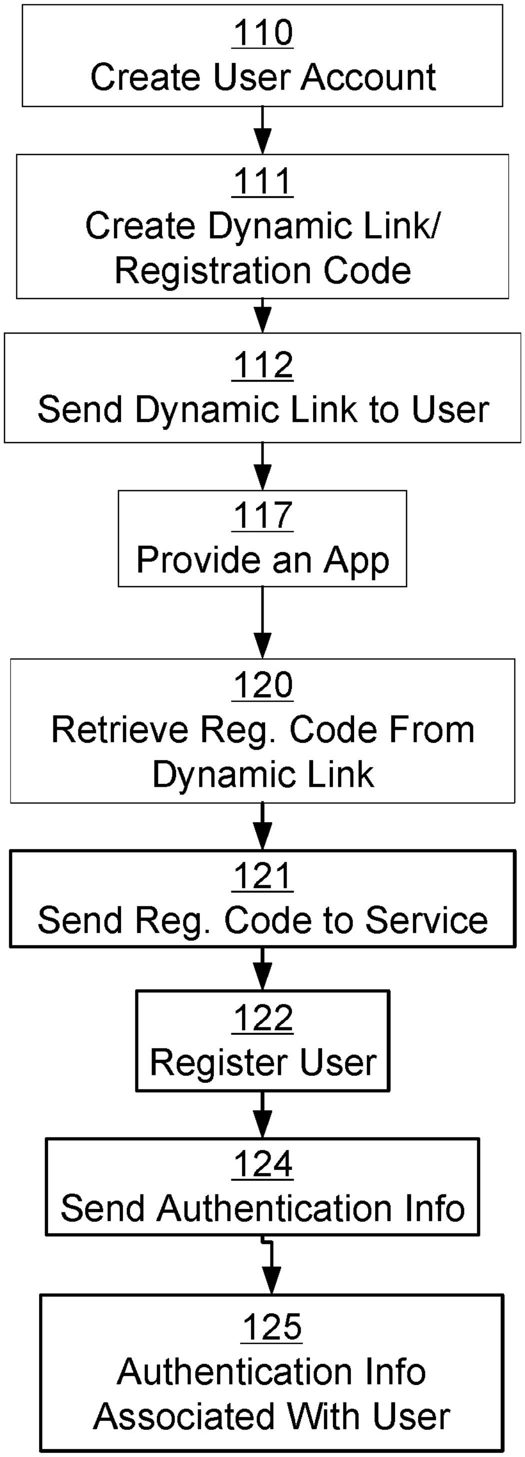
FIG. 1 illustrates an exemplary decision flow process for an auto-registration method according to embodiments described herein.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Exemplary embodiments of the system and method described herein may be configured to handle multiple accounts running from the same authentication server. Typically an account is owned by a business or enterprise who has control of user's access and of authorization of applications and web resources to which the user has access. The registration can be either user or account holder initiated. An example of a user initiated registration is when a user goes to an e-commerce site that is using system and methods described herein. When the user decides to set up an account for future purchases, the user would enter, at a minimum, their name and email address. They may also enter other information such as a phone number, address, and credit card information. This latter information, except for the phone number, can remain with the account holder or the account holder payment service. The only information needed to preform embodiments described herein include the name and unique email address, except when the user desires to be registered by SMS instead of by email. Once the user has provided the required information, they are sent an email, SMS, or other communication link. The user opens the email, SMS, or communication link on their device and selects "register." If the user does not have the appropriate application available on their device, the device is controlled (either automatically or manually) to go to the appropriate app store and download the app. The user just has to click "download." The app will download and a registration code will be automatically registered. If the user already has the application setup in use for another account, a new account may be created and set up within the application.

Exemplary embodiments include no usernames or passwords needed to manually enter into the mobile application for registration. Exemplary embodiments also do not use user requirement to search for the needed application in the application store. This method also provides a layer of security by eliminating a long-lived password as a means for associating a mobile application with an existing service provider account.

Exemplary embodiments described herein include a system and method that allows for a much simpler user onboarding experience when registering a new mobile application with a service provider. Exemplary embodiments may permit application registration without usernames or passwords manually entered into the mobile application by the user for registration. Exemplary embodiments may permit the retrieval of a desired application without searching and downloading the application from an application store. Exemplary embodiments may also provide a layer of security by eliminating or reducing the use of long-lived passwords as a means for associating a mobile application with an existing service provider account.

An exemplary embodiment includes a method for registering a software application, including creating a dynamic link, sending the dynamic link to a user to be accessed by the user from a mobile device, and automatically registering an application access by the dynamic link when the dynamic link is activated by a user. The exemplary embodiment may include any combination of additional features or steps, including, without limitation, creating a user account associated with a service provider through a website interface, and the application is a mobile application from the service provider, linking the user account to the mobile application during the automatic registration process, automatically determining whether the application is installed on the mobile device, or automatically navigating the mobile device to a user interface for downloading the application if the application is not installed on the mobile device. The dynamic link may be sent to the user after a user enters registration information through a user interface of a web browser communicating with a server associated with a service provider. The dynamic link may be configured to authenticate the application with the server without the need to receive a user entered credential including a password. Alternatively, or in addition thereto, the dynamic link may include a deep link associated with an application configured to be stored and run on the mobile device of the user, and/or the dynamic link may include a registration code unique to the user. The registration code may be configured to be used with the application for automatically registering the application to the user. The deep link may provide additional user information for authentication to the application and/or server of the service provider.

FIG. 1 illustrates an exemplary flow diagram according to embodiments described herein.

Exemplary embodiments include at step 110 first creating a user account. The user account may be created by a user or an administrator on a web portal attached to a service provider. During this registration process, user information may be added to the user account. User information can include an email address, a mobile number, or other communication identification, but may include any combination of pieces of user information.

Exemplary embodiments include at step 111 providing a registration code for the user and embedding the registration code within a dynamic link. The registration code may be any code that uniquely identifies the user. The registration code may be used to identify the user as the user of the created user account from step 110, when the user is trying to associate another remote application to their account. Conventional systems may provide information to the user and/or may require the user to reenter information into the mobile application or other remote software interface to re-identifying or authenticating the user. However, such duplicative steps are cumbersome and frustrating for a new user. Exemplary embodiments described herein, integrate the registration code and/or any desired information for relating to the remote software application within a dynamic link. The registration code may be any unique identifier associated with the user. In an exemplary embodiment, the registration code is a temporary or short lived code associated with the user. The registration code may consist of any sequence and length of numbers, letters, characters, and combinations thereof sufficient to make the code significantly difficult to guess.

When the account is initially created or at some time thereafter, a mobile application registration message may be sent to the user at step 112. The mobile application registration message may be sent to the user via email, SMS, or other entered communication identification method. This message may contain the dynamic link including the registration code. The dynamic link may be embedded in a button, such as might be found in an email, or a web link that can be selected by the user.

Exemplary embodiments include the user receiving the mobile app registration message at a mobile device of the user intended to receive the mobile application associated with the web portal or service provider. When the user receives the registration message, the user may click on the registration button in an email or web link in an SMS message or otherwise activate the message link. Exemplary embodiments may include initiating a service after activating the button or web link that checks the device to see if the mobile application needed to register the user is already installed. If the needed application is not installed, the service automatically takes the user to the appropriate application store page, such as the Apple App Store or Google Play Store, for the needed application. Once directed to the application store page, the user can click the install button for that application to install it. After installing the application, the user opens the application.

At some point, whether during the initiation of the dynamic link or at some prior time, an application is provided to the user at step 117. The application is stored on memory of an electronic device of the user, and when executed by the processor of the electronic device is configured to perform the application functions desired by the service provider. The mobile application is also configured to automatically register the user of the user account created at step 110. Once the user selects the dynamic link, an associated application is launched. If the application was downloaded during or after the activation of the dynamic link, upon opening the application, a service in the app determines that the registration process initiated before an app was installed is to be continued. Once the application is opened, a service in the app receives the registration code embedded in the dynamic link at step 120. The application then uses the registration code in the link to register the user with the service provider at step 122. This may also include the use of an email address, username, or other identifier in addition to the registration code. In the situation where the app was previously installed, the dynamic link service could return the dynamic link to the installed application for continuing the registration process without the need to install the app first.

During registration, such as at step 122, the user may be prompted in the mobile application to choose an authentication method to access the mobile application functionality in the future. This may include a biometric, a PIN number, a knowledge factor, such as a password, or a photo sequence. It is understood that other authentication factors may also be involved in the registration process and this list is not intended to be exhaustive, but rather illustrative of various authentication methods. Any available authentication methods may be chosen to secure the app for future use after initial registration. The application may be configured to send the entered authentication method and/or associate authentication information to the service provider at step 124 and at step 125 the authentication information may be associated with the user and/or the user account created at step 110.

Figure 2:
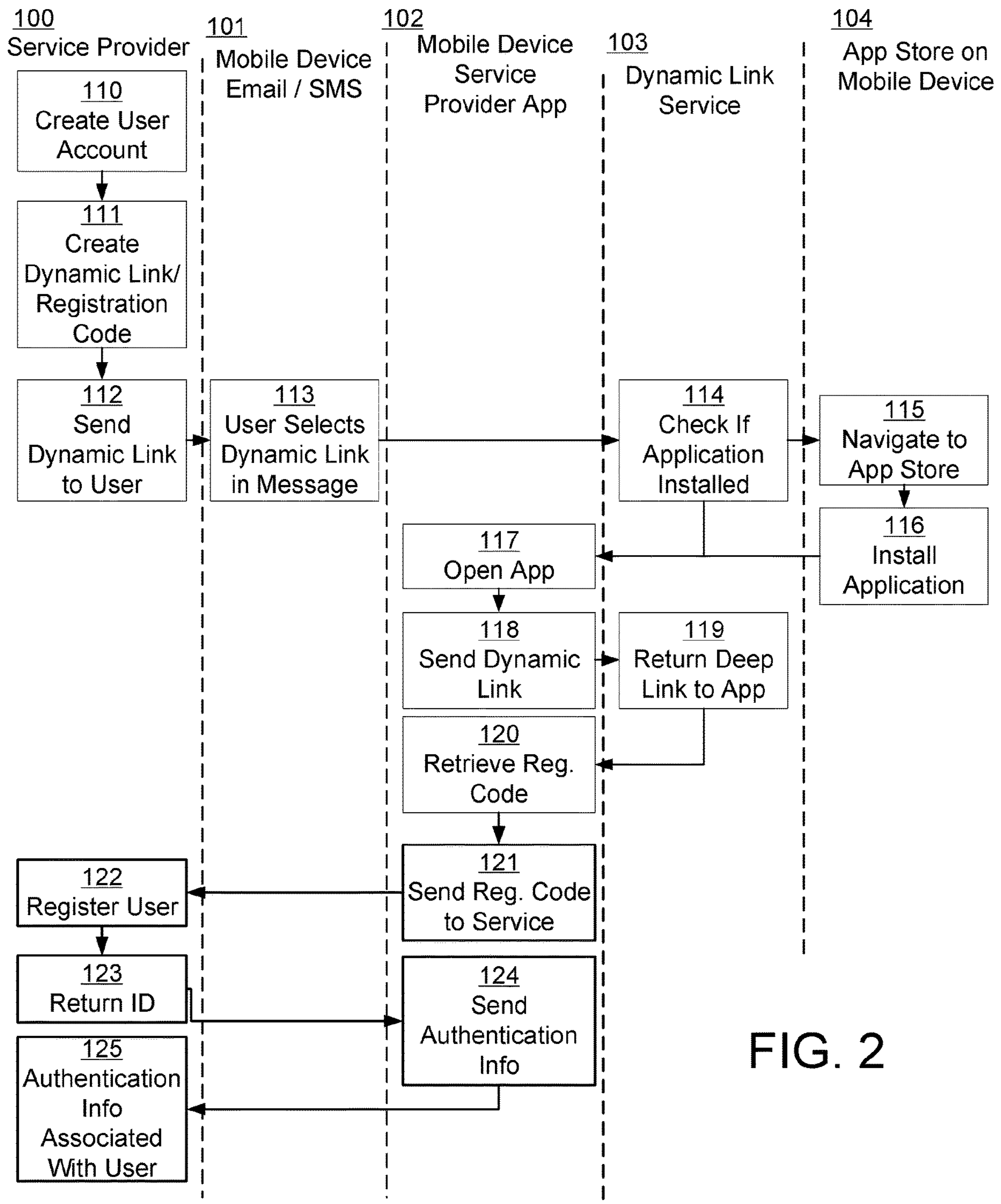
FIG. 2 illustrates an exemplary auto-registration method according to embodiments described herein.

FIG. 2 illustrates an exemplary process of registering a mobile application 102 with a service provider 100 when initiated from a dynamic link present in an email or SMS 101 and a service provider application 102 is not installed on the user's mobile device. First, a user account is created on a service provider 110. After the user account is created, a dynamic link with a registration code is created 111 and sent to the user via email or SMS at step 112. For example, the dynamic link may contain a registration code. The user opens the email or SMS application 113 on their mobile device and clicks the dynamic link. At step 114, the dynamic link service 103 determines if the service provider application 102 is installed on the mobile device. If the service provider application 102 is not installed on the mobile device, the dynamic link service 103 directs the user to the app store 104 for that particular mobile device operating system at step 115. The user then installs the service provider application 102 at step 116. The user opens the service provider application 117 and the dynamic link service library in the service provider application 102 sends the dynamic link 118 to the dynamic link service 103. The dynamic link service 103 returns the deep link to the service provider application 119. Alternatively, the dynamic link service library may send the dynamic link directly to the service provider application, such as through an object that contains the deep link in a recognizable format, such as a uniform resource locator (URL) property. The service provider application 102 parses the deep link for a registration code 120. The registration code is sent to the service provider 100 where it is used to register the service provider application to the user 122 and a registration session identifier is returned 123 to the service provider application 102.

Authentication information 124 is sent from the service provider application 102 at step 124 to the service provider 100 and associated with the user account 121 at step 125.

Figure 3:
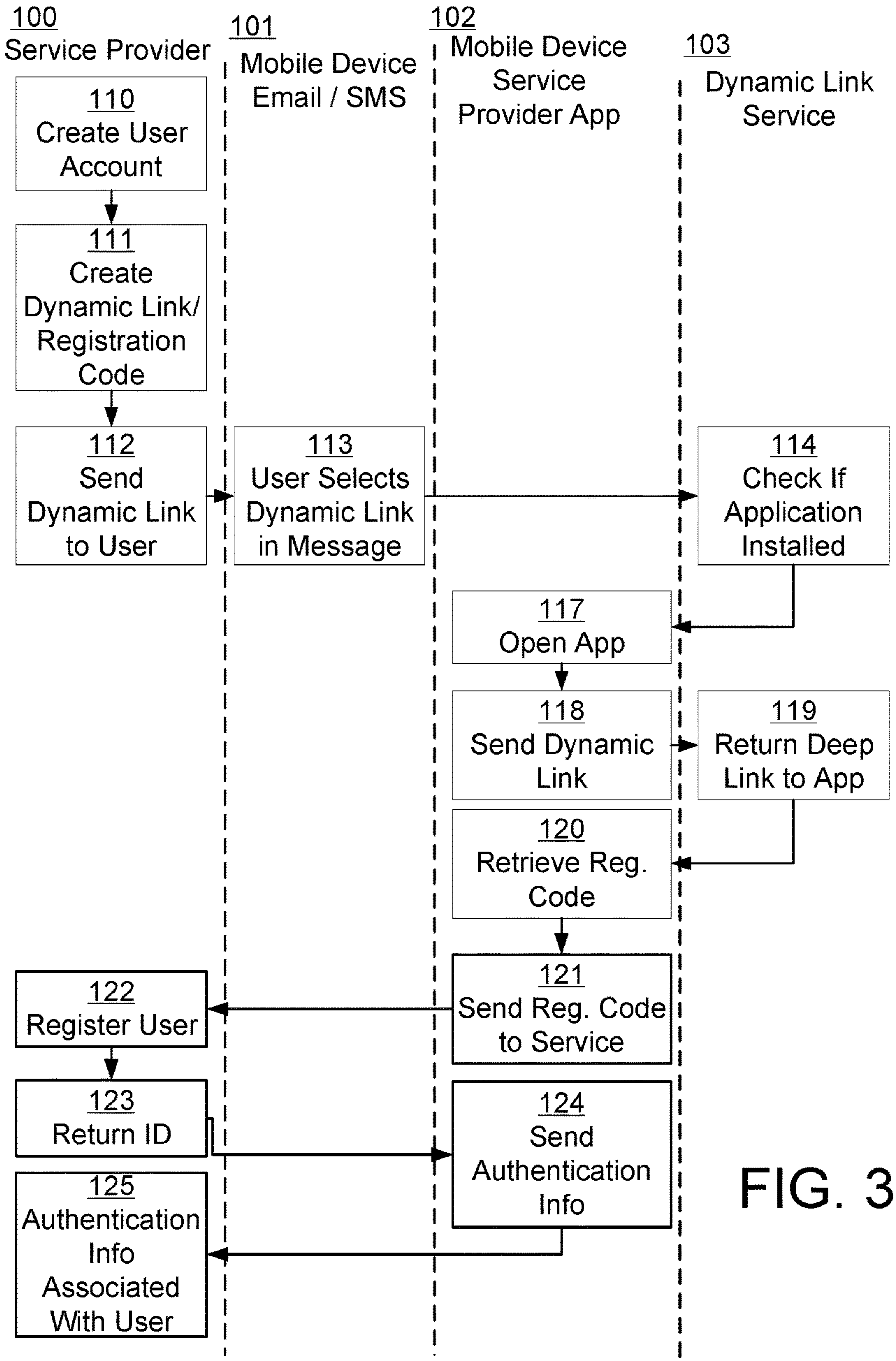
FIG. 3 illustrates an exemplary auto-registration method according to embodiments described herein.

FIG. 3 depicts the process of registering a mobile application 102 with a service provider 100 when initiated from a dynamic link present in an email or SMS 101 and a service provider application 102 is already installed on the user's mobile device. First, at step 110, a user account is created associated with a service provider 100. After the user account is created, a dynamic link with a registration code is created 111 and sent to the user via email or SMS or other communication method at step 112. The user opens the email or SMS application 113 on their mobile device and clicks the dynamic link or otherwise selects the dynamic link. The dynamic link service 103 determines if the service provider application 102 is installed on the mobile device at step 114. If the service provider application 102 is already installed on the mobile device, the dynamic link service 103 opens the service provider application 201 at step 117. The dynamic link service library in the service provider application 102 sends the dynamic link 201 to the dynamic link service 103 at step 118. The dynamic link service 103 returns the deep link to the service provider application at step 119. The service provider application 102 parses the deep link for a registration code at step 120. The registration code is sent to the service provider 100 at step 121 where it is used to register the service provider application to the user at step 122 and a registration session identifier is returned to the service provider application 102 at step 123. Authentication information is sent from the service provider application 102 to the service provider 100 at step 124 and associated with the user account at step 125.

Figure 4:
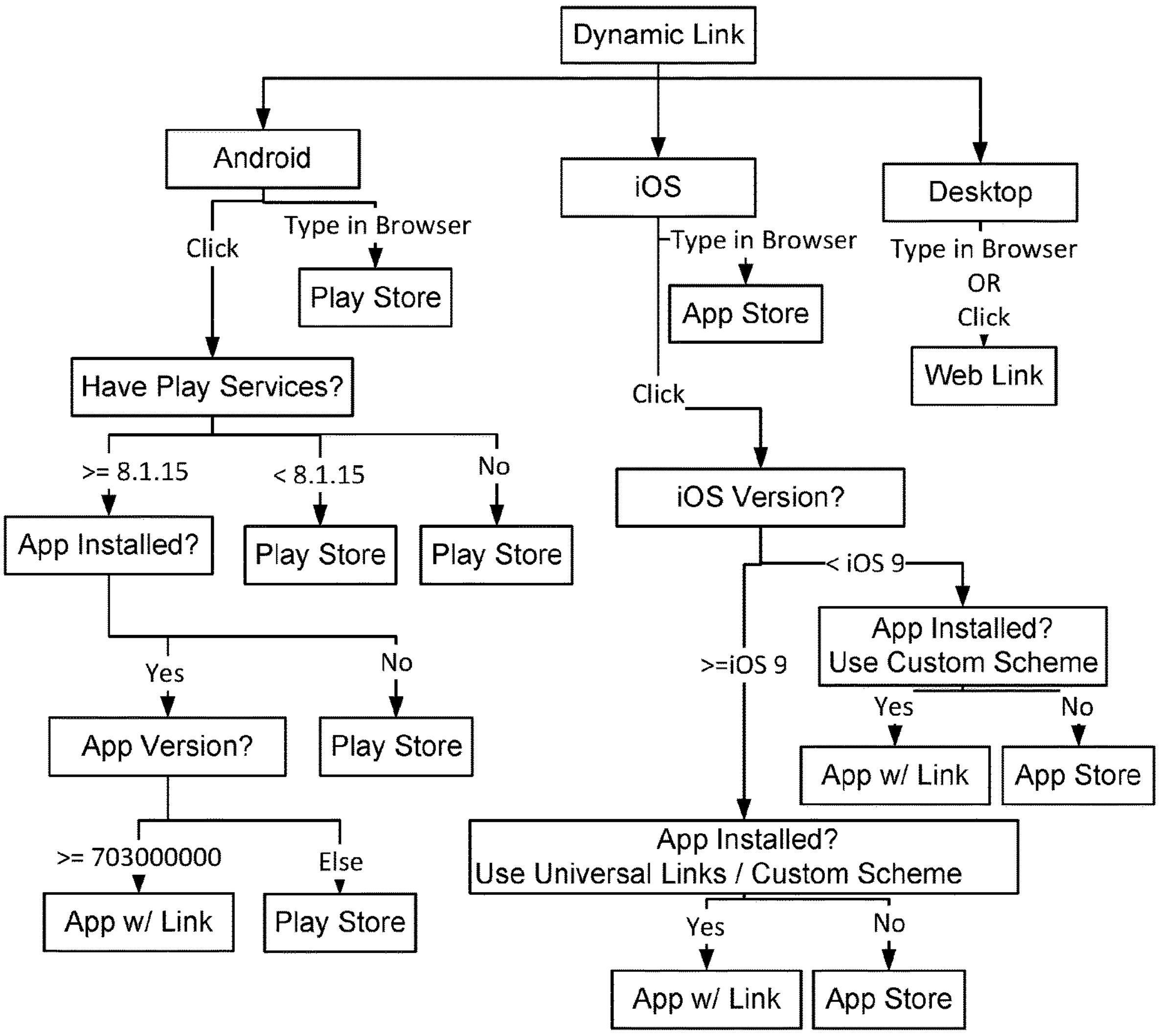
FIG. 4 illustrates an exemplary decision flow process of the dynamic link service.

FIG. 4 illustrates an exemplary decision process for dynamic links. The dynamic link determines what operating system activated the device. The decision process then determines whether the application is installed. If the application is installed then the system proceeds with providing the deep link to the application. If the application is not installed then the system proceeds with navigating the user to an interface for retrieving or downloading the application. The dynamic link may also verify that the application is the correct version before proceeding with providing the deep link. If the application version is outdated, the dynamic link decision process may navigate the user to the application store or other update interface to update the application to a more current version.

FIGS. 5-11 illustrate exemplary user interfaces encountered during implementation of exemplary embodiments of the method described herein.

Figure 5:
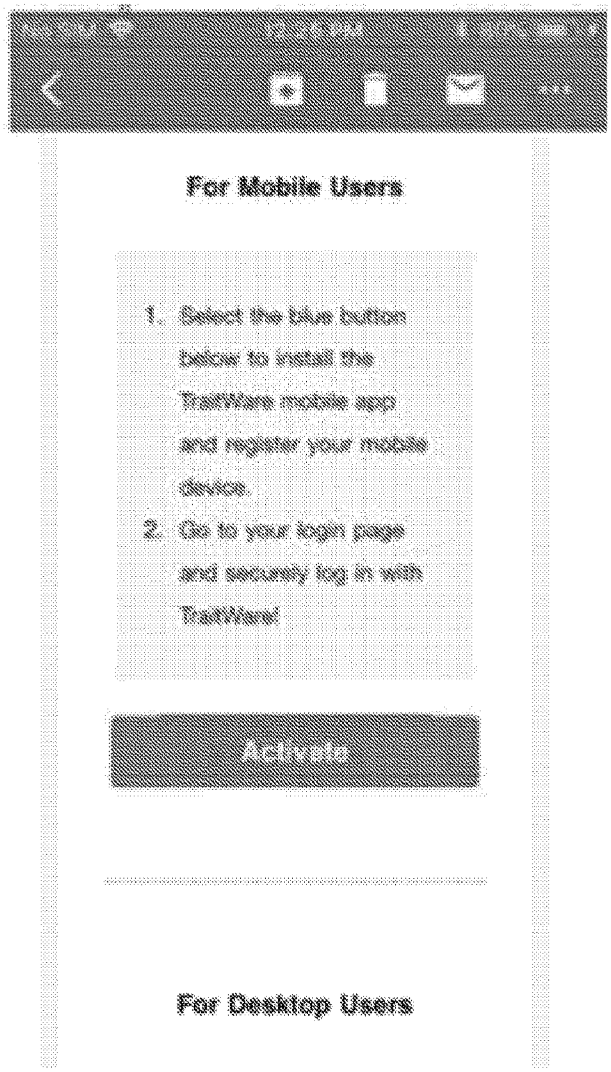
FIGS. 5-11 illustrate exemplary user interfaces for the methods described herein.

FIG. 5 illustrates an exemplary email sent to a new user with an automatic registration button. The auto registration button may contain the dynamic link. The user taps on or selects the button in the email to initiate the automatic registration process from their device.

Figure 6:
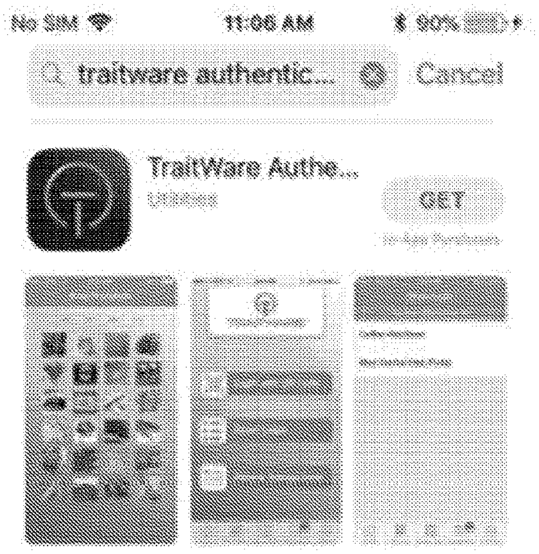

FIG. 6 illustrates an exemplary user interface showing a listing for a service provider application in the app store. If the dynamic link service determines the needed service provider application is not installed on the device, the user may be directed to the app store to download the needed service provider application.

Figure 7:
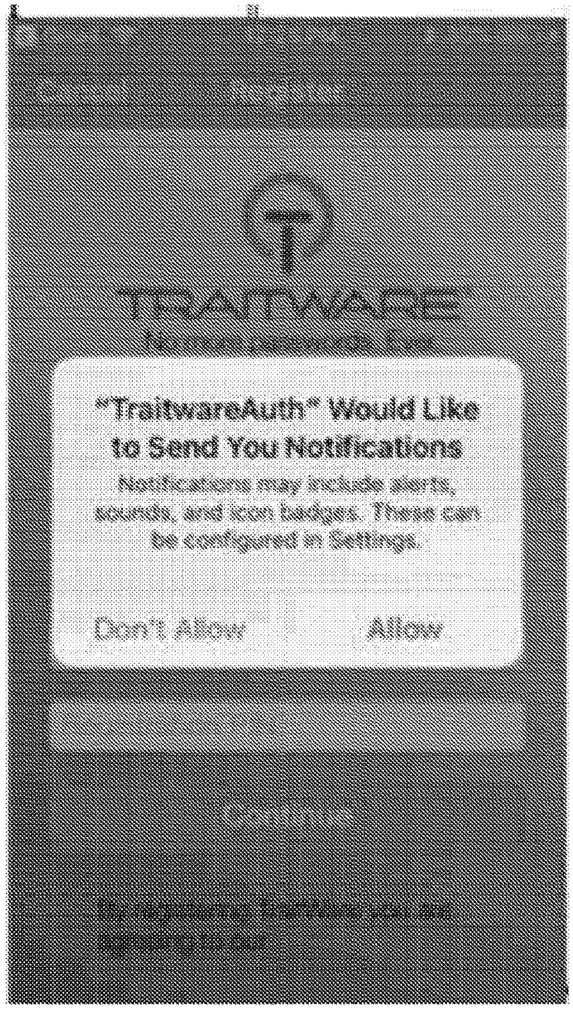

FIG. 7 illustrates an exemplary user interface showing the service provider application during registration. Some app permissions may be requested by the user during the automatic registration process. In this instance the app permission is asking to send push notifications.

Figure 8:

FIG. 8 illustrates an exemplary user interface displaying a visual indicator to the user to indicate that the automatic registration process is taking place. This display may be displayed as the system is implementing steps according to embodiments described herein, including, without limitation, accessing the deep link, retrieving registration code from the dynamic link, sending the registration code to the service provider, registering the user, sending authentication information to the mobile device, and combinations thereof. Retrieving the registration code from the dynamic link may include parsing the registration code from the deep link associated with the dynamic link.

Figure 9:
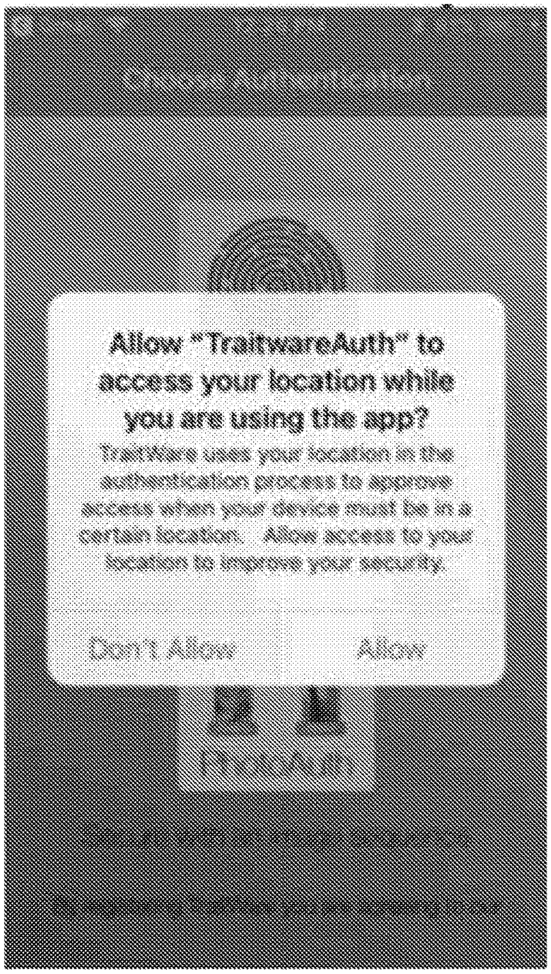

FIG. 9 illustrates an exemplary user interface to request the user for an app permission that may be requested for additional authentication factors. In this instance, permission to use the location of a user during authentications is being requested. Any additional requests to permit access or configure the application may be presented to the user.

Figure 10:
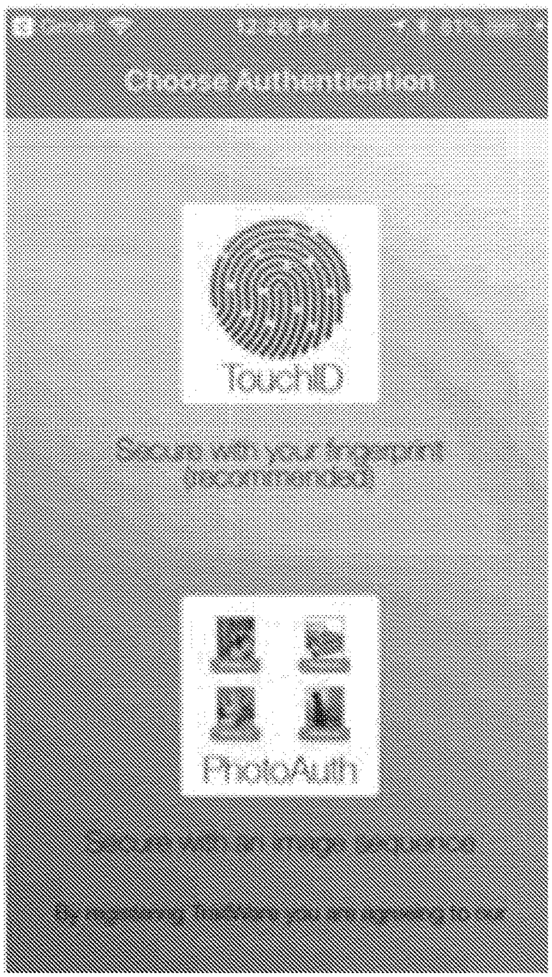

FIG. 10 illustrates an exemplary user interface displaying the service provider application asking for additional authentication factors during the automatic registration process. The user is asked to choose an authentication method for future use of the app after the automatic registration has completed. In this instance, the user is being asked to choose between a fingerprint authentication or photo sequence authentication. Exemplary embodiments of a photo sequence authentication may include a visual PIN using a sequence of images. Any alternative authentication system may be used, such as a password, pin, biometric entry, or combinations thereof.

Figure 11:
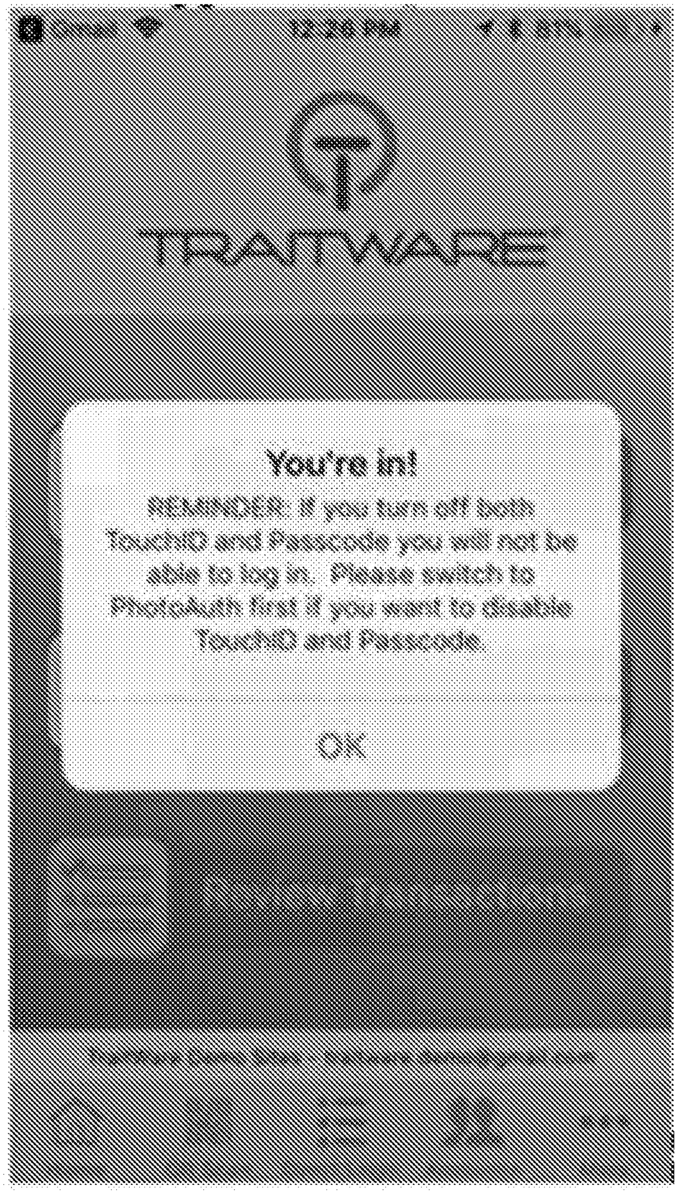

FIG. 11 illustrates an exemplary user interface in which the user is granted access to the application after successfully completing the automatic registration process.

Figure 12:
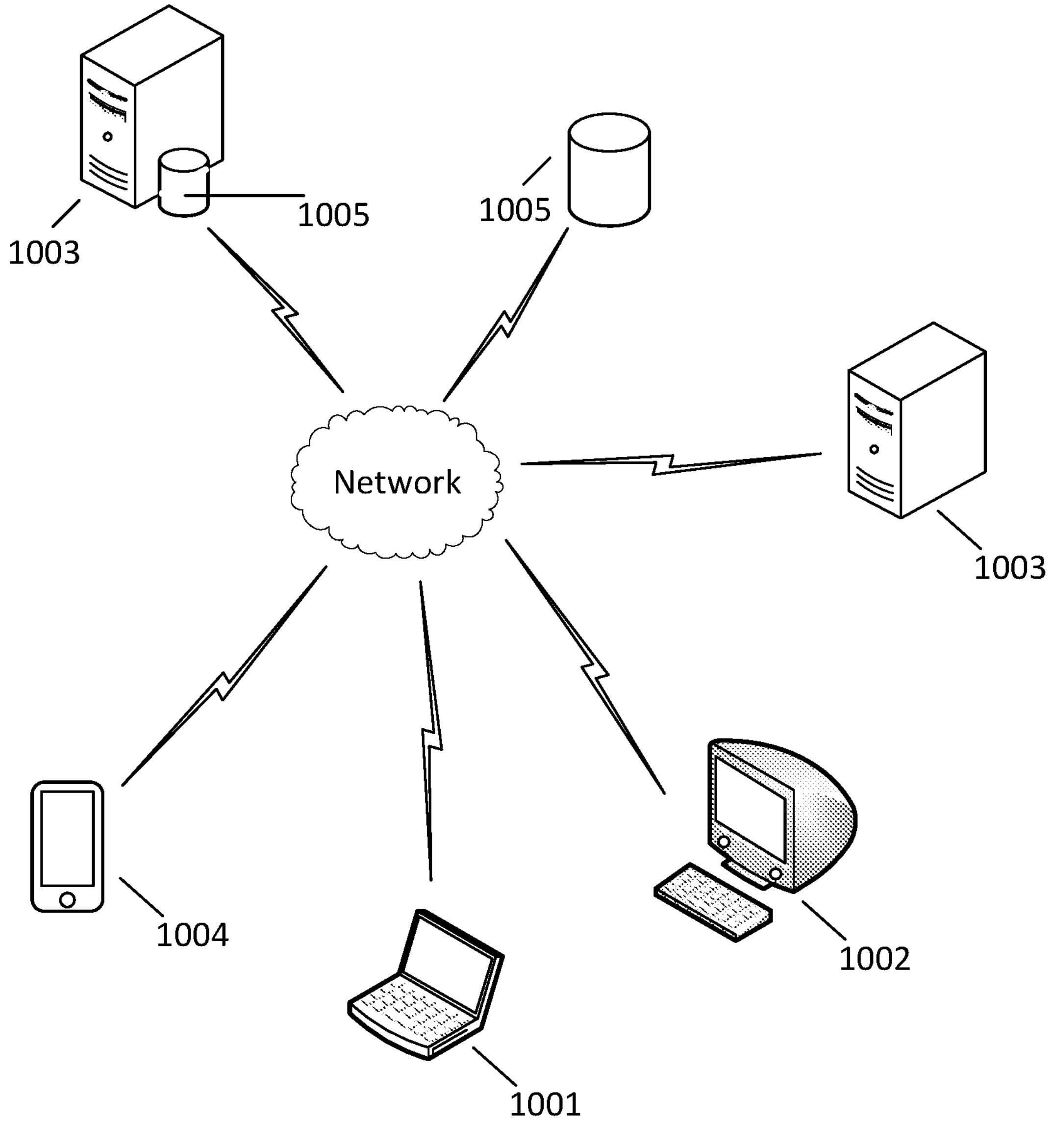
FIG. 12 illustrates an exemplary system configuration according to embodiments described herein.

FIG. 12 illustrates exemplary embodiments of a communication platform according to embodiments described herein that can include authenticating mobile applications to service providers according to embodiments described herein. Exemplary embodiments of the system described herein may include a computer, computers, electronic device, or electronic devices. As used herein, the term computer(s) and/or electronic device(s) are intended to be broadly interpreted to include a variety of systems and devices including personal computers 1002, laptop computers 1002, mainframe computers, servers 1003, set top boxes, digital versatile disc (DVD) players, mobile phone 1004, tablet, smart watch, smart displays, televisions, and the like. A computer can include, for example, processors, memory components for storing data (e.g., read only memory (ROM) and/or random access memory (RAM), other storage devices, various input/output communication devices and/or modules for network interface capabilities, etc. For example, the system may include a processing unit including a memory, a processor, an analog-to-digital converter (A/D), a plurality of software routines that may be stored as non-transitory, machine readable instruction on the memory and executed by the processor to perform the processes described herein. The processing unit may be based on a variety of commercially available platforms such as a personal computer, a workstation a laptop, a tablet, a mobile electronic device, or may be based on a custom platform that uses application-specific integrated circuits (ASICs) and other custom circuitry to carry out the processes described herein. Additionally, the processing unit may be coupled to one or more input/output (I/O) devices that enable a user to interface to the system. By way of example only, the processing unit may receive user inputs via a keyboard, touchscreen, mouse, scanner, button, or any other data input device and may provide graphical displays to the user via a display unit, which may be, for example, a conventional video monitor. The system may also include one or more large area networks, and/or local networks for communicating data from one or more different components of the system. The one or more electronic devices may therefore input a user interface for displaying information to a user and/or one or more input devices for receiving information from a user. The system may receive and/or display the information after communication to or from a remote server 1003 or database 1005.

The following is one example of how the registration information is passed to a user to register an application with a service provider without a username or password.

First, a mobile application is created and registered with a service provider to be associated with other needed information to perform the steps described herein.

Second, a deep link is created using a dynamic link service provider, such as Google Firebase. This will be used by the application to register the user.

https://activation.serviceprovider.com/
?activationCode=${activCode}&emailAddress=
${userEmail}

Third, the deep link is inserted into a dynamic link. The dynamic link also contains information about the mobile application needed to register the user. The application information may be needed if the application is not installed on the user's device. This may contain information about mobile applications for multiple platforms, such as iOS and Android.

```
https://serviceproviderautoactivation.page.link/?link=${encodedDeeplink}&isi=${Env.SERVIC
EPROVIDER__AUTO__ACTIVATION__ISI}&ibi=${Env.SERVICEPROVIDER__AUTO__ACTIV
ATION__IBI}&apn=${Env.SERVICEPROVIDER__AUTO__ACTIVATION__APN}&afl=${Env.S
ERVICEPROVIDER__AUTO__ ACTIVATION__AF L}
```

As an example, a dynamic link message embedded in an email button or SMS web link may have the form:

```
http://email.activation.traitware.com/wf/click?upn=3DfoEmpGD=
oLHri3jNwp5mRkUBgIQ2ya1KrNaYZcmIHwRftD4k-
2FP3Xrc59lQBgtgutoNjPAC2ZU7SmHelFU= c83Uq-2FYWiqhkNqR-
2Fj58dxJwVDDt1hjKFXSd2WkiChO9afqErr1ppfaLiTDIx3A4-2Bx5-2FZ=
khiJLzVkGGKaqi92xS-2FpT-2FsURFNzwNt5iKGEJeLDw-2BoUHU5ZJjGFIuzGanltPy-
2FXcGp= regQeB0ySkQl3JLq4-2B9Qd1kobDtsep5IuXMNIklOP3w2bcmH9iPhx-
2Fq8XsXOrF4eOW-
2FxZ=gYK5ek5Dco8yIdhM1AU50NQEXiARPLQDtMtlVWudvukGY4WYk5gawq6QES4X3x
AdAmwBlIRknd3= 4hPTg6bMpvs1IJNRi-2BZEVhl7PjvfkihlWmKnqhD-
2Boo5bWuDgg1OWaCACtsDbKH-2FxgHF-2B= VbjkgPIPleeL8RYLCcbCmIyi7yx-
2FLezzzIyvMYPVZ3-2FG2mBfZPNHzeyf7DQIB3KTcc-3D__-= 2F2kE4d6zW-
2FK3bcRbEpDszrRcwDs2Hy8uSwb9uYU0rYd6Mgh0o-2BPdbnbaEMWexGgXLUHRdeIf=
pjFmAw6T5T06XiTIPHP5X-
2FyWZMxGwZmWHgGIjLvjnM9qMgyfLlziYF0qoC3yFGSAqpp-2Fo6o=
XuEvxZecdKZJKaVVlwY7WLBcVaZD6NAYpdkuHHqW9k-
2B5TZ6f8Pp329tZLugslbZa2eZkmLBw-= 2B9Aa-2F-2F80jnhHoOh7dk7qVY-3D
```

Following is a sample deep link used by the application to auto-register the user after the application is installed:

https://activation.serviceprovider.com/
?activationCode=173406649779&emailAddress=
user@serviceprovider.com.

After the dynamic link is constructed, it may be passed to the user via an email, SMS, or other appropriate secure delivery method. For example, the link may be sent from one device directly to another via Bluetooth, NFC, WiFi, or any other device to device communication protocol known in the art of electronic communication. When the dynamic link is opened by the user, the Firebase or other service provider checks to see if the needed application is installed. If it is not, it takes the user to the appropriate application store page, such as the Apple App Store or Google Play Store, for the needed application. Once directed to the application store page, the user can click the install button for that application to install it. After installing the application, the user opens the application. Upon opening the application, the Firebase service or other service provider in the app determines that the deep link intended to be passed to the application prior to the application being installed may now be handled by the installed application. The Firebase or other service handles the dynamic link and returns the deep link to the application for further use. The application then uses the registration code in the deep link to register the user with the service provider. This may also include the use of an email address, username, or other identifier in addition to the registration code. In the situation where the app was previously installed, the dynamic link service could return the dynamic link to the installed application for continuing the registration process without the need to install the app first.

In one embodiment, if the registration code is verified by the service provider as being a valid registration code, the service provider may return a registration session identifier to the mobile application. The mobile application may use this registration session identifier to send other registration items to the service provider to be associated with the user account, such as authentication keys, cryptographic keys, and other device information for future authentications with the service provider. In another embodiment, all of the needed authentication information and device information is sent along with the registration code and associated with the user account of the service provider.

Exemplary embodiments include a method of authenticating a user. The method may include any combination of features, such as, for example, receiving a unique communication identifier for a user to be authenticated, sending a communication using the unique communication identifier to the user to a device of the user, receiving a confirmation by the user to authenticate the user, automatically downloading an authentication application to the device of the user to complete the authentication of the user, or providing a registration code to the authentication application to automatically register the user. The unique communication identifier may be an email address of the user, a mobile phone number of the user, a uniquely assigned identification, and combinations thereof. The confirmation may be performed by selecting an item from the communication, selecting a link within the communication, selecting an accept icon within the communication, or other method. The automatic download may occur after the user enters an acceptance to download the application. Exemplary embodiments may permit authentication and/or registration to occur without entering or receiving a user entered user name and/or password. Exemplary embodiments may be used to authenticate a user without having the user having to search for an authentication program to download onto the device by the user, but may automatically navigate to an appropriate authentication program and may automatically download or download after confirmation of intent to download the appropriate authentication program.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Exemplary embodiments of the system automate and integrate retrieval, downloading, registration, and combinations thereof of a mobile application on a mobile device with a service provider. The system provides improvements such as in the efficiency and reduced frustration and reduced error input for registering applications from a mobile device with a service provider thus improving efficiency and convenience. As shown, a user may communicate with a service provider, such as through the network to a server 1003 from a laptop 1001 or other computer 1002. The server may provide a web browser to send and receive information from the user. The web interface of the web browser may include registration or user information from the user. The system may be configured to retrieve the entered user information and store the information in one or more databases 1005. The system may then be configured to send an electronic message over the network to a mobile device 1004 of the user. The system may be configured to display a link to the user on the mobile device. The link may be through email, SMS, or other messaging system and may include any user interface such as an alphanumeric combination of characters, a button, or other icon to be launched by the user by clicking or touching the link.

When used in this specification and claims, the terms "comprises" and "comprising" and variations thereof mean that the specified features, steps or integers are included. The terms are not to be interpreted to exclude the presence of other features, steps or components.

Although embodiments of this invention have been described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of authenticating a user, comprising:

receiving a unique communication identifier for a user to be authenticated;

before an authentication application is downloaded to a device of the user, sending a communication to the device of the user using the unique communication identifier, wherein the communication includes a dynamic link comprising a deep link associated with the authentication application configured to be stored and run on the device of the user;

receiving a confirmation by the user to authenticate the user;

after sending the communication to the device and receiving the confirmation by the user, automatically downloading the authentication application to the device of the user using the deep link;

providing a registration code from the dynamic link to the authentication application to automatically register the user; and automatically completing the authentication of the user using the authentication application and the registration code from the dynamic link.

2. The method of claim 1, wherein the unique communication identifier is an email address of the user.

3. The method of claim 1, wherein the unique communication identifier is a mobile phone.

4. The method of claim 1, wherein the confirmation is performed by selecting an item from the communication.

5. The method of claim 1, wherein the confirmation is performed by selecting a link within the communication.

6. The method of claim 1, wherein the confirmation is performed by selecting an accept icon within the communication.

7. The method of claim 1, wherein the automatic download occurs after the user enters an acceptance to download the application.

8. The method of claim 1, wherein the user is authenticated without entering a user name or password.

9. The method of claim 1, wherein the user is authenticated without having to search for an authentication program to download onto the device.

10. The method of claim 1, wherein the registration code is configured to be used with the application for automatically registering the application to the user.

11. The method of claim 10, further comprising creating a user account associated with a service provider through a website interface, and the application is a mobile application from the service provider.

12. The method of claim 11, further comprising automatically registering the application to the user and linking the user account to the mobile application.

13. The method of claim 12, wherein the deep link provides additional user information for authentication.

14. The method of claim 13, further comprising automatically determining whether the application is installed on the mobile device.

15. The method of claim 14, wherein the automatically downloading the authentication application is performed after determining the application is not installed on the mobile device and the automatically downloading the authentication applications further comprising automatically navigating the mobile device to a user interface for downloading the application.

16. The method of claim 1, wherein the dynamic link is sent to the user after a user enters registration information through a user interface of a web browser communicating with a server associated with a service provider.

17. The method of claim 16, wherein the dynamic link is configured to authenticate the application with the server without the need to receive a user entered credential including a password.

18. The method of claim 1, wherein the communication includes the dynamic link comprising the deep link and the registration code embedded in the dynamic link and providing the registration code from the dynamic link to the authentication application comprises parsing the dynamic link for the registration code.

* * * * *